United States Patent
Takahashi et al.

(10) Patent No.: US 12,115,958 B2
(45) Date of Patent: Oct. 15, 2024

(54) VEHICLE BRAKING CONTROL DEVICE

(71) Applicant: ADVICS CO., LTD., Kariya (JP)

(72) Inventors: Atsushi Takahashi, Kariya (JP); Hiroyuki Kodama, Kariya (JP)

(73) Assignee: ADVICS CO., LTD., Kariya (JP)

( * ) Notice: Subject to any disclaimer, the term of this patent is extended or adjusted under 35 U.S.C. 154(b) by 386 days.

(21) Appl. No.: 17/610,911

(22) PCT Filed: May 19, 2020

(86) PCT No.: PCT/JP2020/019748
§ 371 (c)(1),
(2) Date: Nov. 12, 2021

(87) PCT Pub. No.: WO2020/235548
PCT Pub. Date: Nov. 26, 2020

(65) Prior Publication Data
US 2022/0212639 A1     Jul. 7, 2022

(30) Foreign Application Priority Data

May 23, 2019   (JP) .................................. 2019-097135

(51) Int. Cl.
*B60T 8/17*      (2006.01)
*B60T 13/74*     (2006.01)

(52) U.S. Cl.
CPC .............. *B60T 8/17* (2013.01); *B60T 13/745* (2013.01); *B60T 13/746* (2013.01)

(58) Field of Classification Search
CPC ........ B60T 8/17; B60T 13/746; B60T 13/745; B60T 7/042; B60T 8/265; B60T 8/96
See application file for complete search history.

(56) References Cited

U.S. PATENT DOCUMENTS

| 7,552,978 B2 * | 6/2009 | Yokoyama .............. B60T 8/267 303/3 |
| 2004/0256911 A1 | 12/2004 | Yamamoto et al. |

(Continued)

FOREIGN PATENT DOCUMENTS

| JP | 2004351965 A | 12/2004 |
| JP | 2012106582 A | 6/2012 |

(Continued)

OTHER PUBLICATIONS

International Search Report (PCT/ISA/210) with translation and Written Opinion (PCT/ISA/237) mailed on Jul. 14, 2020, by the Japan Patent Office as the International Searching Authority for International Application No. PCT/JP2020/019748. (8 pages).

*Primary Examiner* — Pamela Rodriguez
(74) *Attorney, Agent, or Firm* — BUCHANAN INGERSOLL & ROONEY PC

(57) ABSTRACT

A braking control device includes a front wheel motor that controls a front wheel hydraulic pressure to adjust a front wheel braking torque, a first motor that adjusts a right rear wheel braking torque, and a second motor that adjusts a left rear wheel braking torque. The front wheel motor includes two-system coils, and the first and second motors include one-system coils. A controller that controls the electric motors includes a one-side drive circuit that energizes one of the two-system coils of the front wheel motor, an other-side front wheel drive circuit that energizes the other of the two-system coils of the front wheel motor, a first rear wheel drive circuit that energizes the one-system coil of the first motor, and a second rear wheel drive circuit that energizes the one-system coil of the second motor.

2 Claims, 5 Drawing Sheets

(56) References Cited

U.S. PATENT DOCUMENTS

2012/0119566 A1     5/2012  Ohnishi et al.
2015/0224970 A1     8/2015  Yasui et al.
2022/0274575 A1*    9/2022  Ganzel .................... B60T 7/042

FOREIGN PATENT DOCUMENTS

JP          2014051197 A      3/2014
JP          2017202766 A     11/2017
JP          2019059345 A      4/2019

* cited by examiner

VEHICLE BRAKING CONTROL DEVICE

TECHNICAL FIELD

The present disclosure relates to a vehicle braking control device.

BACKGROUND ART

Patent Literature 1 describes a braking control device in which pressures (hydraulic pressures) of four wheel cylinders of a vehicle are adjusted by one electric motor. Patent Literature 2 describes a braking control device in which an electric braking device driven by an electric motor is provided on four wheels of a vehicle, a wheel cylinder is provided only on a front wheel, and pressure is applied by a master cylinder. Patent Literature 3 describes a braking control device in which a braking torque of a front wheel is adjusted by a master cylinder and a braking torque of a rear wheel is adjusted by an electric motor.

Presently, vehicles driven by electric motors such as electric cars and hybrid cars have started to spread. In addition, research and development of a vehicle that can be automatically driven are in progress for the future. Among them, a motorized braking control device is also desired.

CITATIONS LIST

Patent Literature

Patent Literature 1: Japanese Unexamined Patent Application Publication No. 2012-106582
Patent Literature 2: Japanese Unexamined Patent Application Publication No. 2004-351965
Patent Literature 3: Japanese Unexamined Patent Application Publication No. 2014-051197

SUMMARY

Technical Problems

An object of the present disclosure is to provide a motorized braking control device in which device redundancy is secured and miniaturization and weight reduction can be achieved.

Solutions to Problems

A vehicle braking control device includes "a front wheel electric motor (MTf) that controls a hydraulic pressure (Pwf) of a wheel cylinder (WCf) of a front wheel (WHf) of a vehicle to adjust a braking torque (Tqf) of the front wheel (WHf)", "a first electric motor (MTk) that adjusts a braking torque (Tqk) of a right rear wheel (WHk) of the vehicle", and "a second electric motor (MTl) that adjusts a braking torque (Tql) of a left rear wheel (WHl) of the vehicle". In the vehicle braking control device, the front wheel electric motor (MTf) has two-system coils (CLx, CLy), and the first and second electric motors (MTk, MTl) have a one-system coil (CLk, CLl).

A vehicle braking control device includes a controller (ECU) that controls the front wheel electric motor (MTf) and the first and second electric motors (MTk, MTl). The controller (ECU) includes "a one-side front wheel drive circuit (DFx) that energizes one side of the two-system coils (CLx, CLy) of the front wheel electric motor (MTf)", "an other-side front wheel drive circuit (DFy) that energizes the other side of the two-system coils (CLx, CLy) of the front wheel electric motor (MTf)", "a first rear wheel drive circuit (DRk) that energizes a one-system coil (CLk) of the first electric motor (MTk)", and "a second rear wheel drive circuit (DRl) that energizes a one-system coil (CLl) of the second electric motor (MTl)".

According to the above configuration, the braking torque of the four wheels of the vehicle is adjusted by the electric motor. In the front wheel WHf, redundancy is secured by the motor coils CLx, CLy of two systems and the one-side and other-side front wheel drive circuits DFx, DFy that energize the motor coils CLx, CLy, respectively. In the rear wheel WHr, the braking torque Tqk of the right rear wheel WHk and the braking torque Tql of the left rear wheel WHl are adjusted by the first electric motor MTk having a motor coil CLk of one system and the second electric motor MTl having a motor coil CLl of one system. Although the motor coils CLk and CLl of the first and second electric motors MTk and MTl are one-system, since the left and right rear wheels are provided with separate and independent electric motors MTk and MTl, redundancy is secured as the rear wheel braking torque Tqr. Therefore, in the braking control device SC, redundancy is secured, and in addition, simplification is achieved as a whole, and miniaturization and weight reduction are achieved.

SYMBOLS OF CONFIGURING MEMBERS, ETC., AND SUBSCRIPTS AT THE END OF THE SYMBOLS

In the following description, configuring members, calculation processes, signals, and the like having the same symbol such as "WH" have the same functions. Subscripts "i" to "l" added to the end of the symbols related to each wheel are comprehensive symbols indicating which wheel they relate to. Specifically, "i" indicates a right front wheel, "j" indicates a left front wheel, "k" indicates a right rear wheel, and "l" indicates a left rear wheel. For example, the four rotating members KT are referred to as a right front wheel rotating member KTi, a left front wheel rotating member KTj, a right rear wheel rotating member KTk, and a left rear wheel rotating member KTl. Furthermore, the subscripts "i" to "l" at the end of the symbols can be omitted. When the subscripts "i" to "l" are omitted, the symbol represents a generic name of the four wheels. For example, "WH" represents each wheel.

The subscripts "f" and "r" added to the end of the symbols are comprehensive symbols indicating which side in the front-rear direction of the vehicle they relate to. Specifically, "f" indicates the front wheel (=subscript "i, j"), and "r" indicates the rear wheel (=subscript "k, l"). For example, in the wheel WH, the front wheel WHf (=WHi, WHj) and the rear wheel WHr (=WHk, WHl) are described. Furthermore, the subscripts "f" and "r" can be omitted.

The subscripts "x" and "y" at the end of the symbols related to the electric system of the front wheel WHf are symbols indicating which system of the two independent electric systems they relate to. Specifically, in the two electric systems, "x" indicates the one-side system, and "y" indicates the other-side system. For example, in the coil CL of the electric motor MT, the one-side system motor coil CLx and the other-side system motor coil CLy are described. The subscripts "x" and "y" at the end of the symbols can be omitted. When the subscripts "x" and "y" are omitted, each symbol represents a generic name. For example, "CL" represents a motor coil of each system.

First Embodiment of Vehicle Braking Control Device

Figure 1:
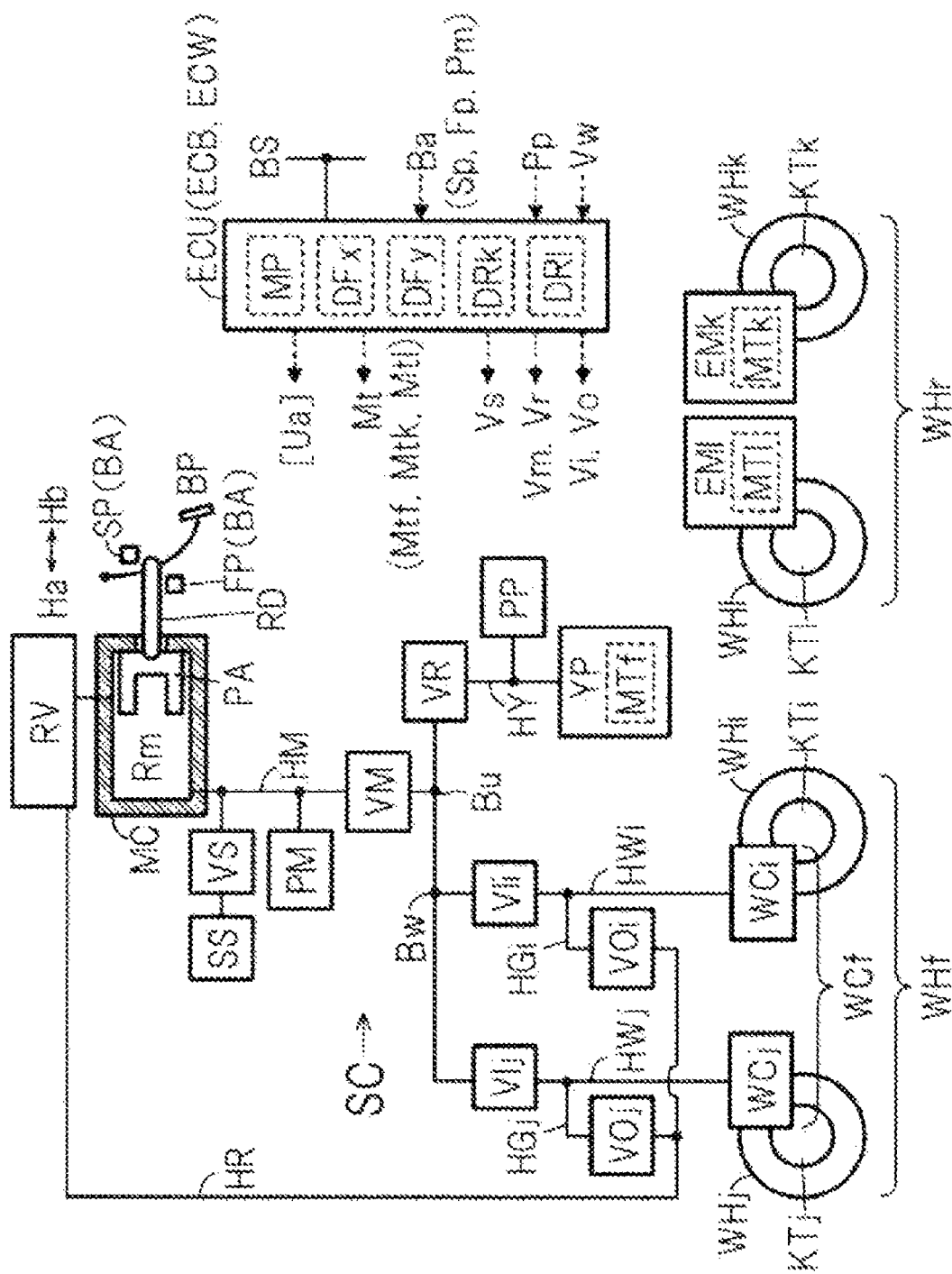
FIG. 1 is an overall configuration view describing an embodiment of a braking control device SC.

An embodiment of a braking control device SC according to the present disclosure will be described with reference to an overall configuration view of FIG. 1. In the vehicle mounted with the braking control device SC, the braking torque Tqf of the front wheel WHf is generated via the working liquid (braking fluid BF), but the braking fluid BF is not used for generating the braking torque Tqr of the rear wheel WHr. That is, the front wheel WHf is provided with a hydraulic braking device, and the rear wheel WHr is provided with an electric-mechanical brake (EMB).

The vehicle is provided with a braking operation member BP, a rotating member KT, a front-wheel wheel cylinder WCf, a master reservoir RV, a master cylinder MC, and a braking operation amount sensor BA.

The braking operation member (e.g., brake pedal) BP is a member operated by a driver to decelerate the vehicle. A braking torque Tq of the wheel WH is adjusted, and the braking force is generated at the wheel WH by operating the braking operation member BP. Specifically, a rotating member (e.g., brake disc) KT is fixed to the wheel WH of the vehicle. A brake caliper is arranged so as to sandwich the rotating member KT.

In the front wheel WHf, the brake caliper is provided with a wheel cylinder WCf. As the pressure (braking fluid pressure) Pwf of the braking fluid BF in the front-wheel wheel cylinder WCf is increased, a friction member (e.g., brake pad) is pressed against the rotating member KT. Since the rotating member KT and the wheel WH are fixed to rotate integrally, the frictional force generated at this time generates a braking torque Tqf (as a result, frictional brake force) at the front wheel WHf. Then, the braking force is generated at the front wheel WHf by the braking torque Tqf.

The master reservoir (also referred to as "atmospheric pressure reservoir") RV is a tank for the working liquid, and interiorly stores the braking fluid BF. The master cylinder MC is mechanically connected to the braking operation member BP through a brake rod RD and the like. A single type is used as the master cylinder MC. A master cylinder chamber (hydraulic pressure chamber) Rm is formed inside the master cylinder MC by the master piston PA. When the braking operation member BP is not operated, the hydraulic pressure chamber Rm of the master cylinder MC is in a communicating state with the master reservoir RV.

When the braking operation member BP is operated, the master piston PA in the master cylinder MC is pushed in the forward direction Ha, and the master cylinder chamber Rm is shut off from the reservoir RV. Furthermore, when the operation of the braking operation member BP is increased, the master piston PA is moved in the forward direction Ha, the volume of the master cylinder chamber Rm is decreased, and the braking fluid (working fluid) BF is discharged from the master cylinder MC. When the operation of the braking operation member BP is reduced, the master piston PA is moved in the backward direction Hb, the volume of the master cylinder chamber Rm is increased, and the braking fluid BF is returned toward the master cylinder MC.

The operation amount Ba of the braking operation member (brake pedal) BP by the driver is detected by the braking operation amount sensor BA. Specifically, as the braking operation amount sensor BA, at least one of a master cylinder hydraulic pressure sensor PM that detects the hydraulic pressure of the master cylinder chamber Rm (master cylinder hydraulic pressure) Pm, an operation displacement sensor SP that detects the operation displacement Sp of the braking operation member BP, and an operation force sensor FP that detects the operation force Fp of the braking operation member BP is adopted. That is, the operation amount sensor BA is a generic name of the master cylinder hydraulic pressure sensor PM, the operation displacement sensor SP, and the operation force sensor FP, and the operation amount Ba is a generic name of the master cylinder hydraulic pressure Pm, the operation displacement Sp, and the operation force Fp.

The master cylinder MC and the wheel cylinder WCf are connected by a master cylinder fluid passage HM and a wheel cylinder fluid passage HWf (=HWi, HWj). The fluid passage is a passage for moving the braking fluid BF which is working liquid, and corresponds to a braking pipe, a flow path of a fluid unit, a hose, and the like. One end portion of the master cylinder fluid passage HM is connected to the master cylinder MC (In particular, the master cylinder chamber Rm). Specifically, the master cylinder fluid passage HM is branched into two at a branch part Bw, and connected to a wheel cylinder fluid passage HWf. An end portion of the wheel cylinder fluid passage HWf is connected to the front-wheel wheel cylinder WCf (=WCi, WCj). The master cylinder MC, the wheel cylinder WCf, and each fluid passage HM, HWf are filled with the braking fluid BF.

<<Braking Control Device SC>>

The braking control device SC includes a master cylinder valve VM, a stroke simulator SS, a simulator valve VS, a master cylinder hydraulic pressure sensor PM, a front wheel actuator YP, a rear wheel actuator EMr (=EMk, EMl), and a controller ECU. In the fluid passages HM and HWf, a side close to the master cylinder MC is referred to as an "upper portion", and a side close to the wheel cylinder WCf is referred to as a "lower portion".

A master cylinder valve VM (also referred to as a "shutoff valve") is provided in the master cylinder fluid passage HM. The shutoff valve VM is a normally-open type electromagnetic valve (on/off valve) having an open position and a closed position. In the "on/off valve", an open position and a closed position are selectively realized. At the start of the braking control device SC, the shutoff valve VM is set to the closed position, and the master cylinder MC and the wheel cylinder WCf are in a shutoff state (non-communicating state).

The stroke simulator (also simply referred to as a simulator) SS is provided to cause the braking operation member BP to generate an operation force Fp. In other words, the operation characteristic of the braking operation member BP (relationship of the operation force Fp with respect to the operation displacement Sp) is formed by the simulator SS.

A piston and an elastic body (e.g., compression spring) are provided inside the simulator SS. When the braking fluid BF is moved into the simulator SS, the piston is pushed by the inflowing braking fluid BF. A force is applied to the piston in a direction of preventing the inflow of the braking fluid BF by the elastic body, so that the operation force Fp when the braking operation member BP is operated is formed.

The simulator SS is connected to the master cylinder MC (that is, the master cylinder chamber Rm) at an upper portion of the shutoff valve VM. A simulator valve VS is provided between the master cylinder chamber Rm and the simulator SS. The simulator valve VS is a normally-closed electromagnetic valve (on/off valve) having an open position and a closed position. When the braking control device SC is started, the simulator valve VS is set to the open position, and the master cylinder MC and the simulator SS are brought to a communicating state. When the capacity of the master cylinder chamber Rm is sufficiently large as compared with the capacity of the wheel cylinder WCf, the simulator valve VS may be omitted.

A master cylinder hydraulic pressure sensor PM is provided at the upper portion of the shutoff valve VM so as to detect a hydraulic pressure (master cylinder hydraulic pressure) Pm of the master cylinder chamber Rm. The master cylinder hydraulic pressure sensor PM corresponds to the operation amount sensor BA, and the master cylinder hydraulic pressure Pm corresponds to the operation amount Ba.

The front wheel actuator YP is connected to the master cylinder fluid passage HM at a lower portion (that is, the merging portion between the shutoff valve VM and the wheel cylinder WCf) Bu of the shutoff valve (master cylinder valve) VM through the communication fluid passage HY. The front wheel actuator YP is driven by the front wheel electric motor MTf and adjusts the hydraulic pressure Pp of the lower portion of the shutoff valve VM. At this time, the shutoff valve VM is energized to be in the closed position. As a result, the hydraulic pressure (braking fluid pressure) Pwf of the wheel cylinder WCf is controlled by the hydraulic pressure Pp. The hydraulic pressure Pp is called "adjusted hydraulic pressure". The adjusted hydraulic pressure sensor PP is provided to detect the adjusted hydraulic pressure Pp. The detected adjusted hydraulic pressure Pp is input to the controller ECU.

The communication fluid passage HY is provided with a communication valve VR. The communication valve VR is a normally-closed electromagnetic valve (on/off valve) having an open position and a closed position. When the braking control device SC is started, the communication valve VR is set to the open position, and the front wheel actuator YP and the wheel cylinder WCf are brought to the communicating state.

Each of the simulator valve VS, the shutoff valve VM, and the communication valve VR electrically includes a winding (coil) of two systems. Each valve coil is energized by the front wheel drive circuits DFx and DFy on one side and the other side of the controller ECU. That is, the simulator valve VS, the shutoff valve VM, and the communication valve VR are electrically duplicated.

The master cylinder fluid passage HM is branched into wheel cylinder fluid passages HWi to HWj at the branch part Bw. In the front wheel WHf, the configuration of the lower portion from the branch part Bw is the same. The wheel cylinder fluid passage HWf (=HWi, HWj) is provided with an inlet valve VIf (=VIi, VIj). As the inlet valve VIf, a normally-open on/off electromagnetic valve is adopted.

A lower portion (that is, between the inlet valve VIf and the wheel cylinder WCf) of the inlet valve VIf is connected to the pressure reducing fluid passage HGf (=HGi, HGj). Furthermore, the pressure reducing fluid passage HGf is connected to the return fluid passage HR, and is ultimately connected to the master reservoir RV. An outlet valve VOf (=VOi, VOj) is provided in the pressure reducing fluid passage HGf. A normally-closed on/off electromagnetic valve is adopted as the outlet valve VOf.

In order to reduce the hydraulic pressure Pwf in the front-wheel wheel cylinder WCf by anti-lock brake control or the like, the inlet valve VIf is set to the closed position and the outlet valve VOf is set to the open position. The inflow of the braking fluid BF from the inlet valve VIf is inhibited, the braking fluid BF in the wheel cylinder WCf flows out to the master reservoir RV, and the braking fluid pressure Pwf is reduced. Furthermore, in order to increase the braking fluid pressure Pwf, the inlet valve VIf is set to the open position and the outlet valve VOf is set to the closed position. The outflow of the braking fluid BF to the master reservoir RV is inhibited, the adjusted hydraulic pressure Pp adjusted by the front wheel actuator YP is introduced into the wheel cylinder WCf, and the braking fluid pressure Pwf is increased. Furthermore, in order to maintain the hydraulic pressure (braking fluid pressure) Pwf in the wheel cylinder WCf, both the inlet valve VIf and the outlet valve VOf are set to the closed positions. That is, the hydraulic pressure Pwf (that is, the front wheel braking torque Tqf) of the front wheel WHf can be adjusted independently by controlling the electromagnetic valves VIf and VOf.

A rear wheel actuator EMr (=EMk, EMl) is provided on the rear wheel WHr (=WHk, WHl) of the vehicle. The rear wheel actuator EMr is provided with a rear wheel electric motor MTr (=MTk, MTl). In the rear wheel actuator EMr, the rear wheel braking torque Tqr (=Tqk, Tql) is directly controlled by the rear wheel electric motor MTr without using the pressure of the braking fluid BF. Specifically, the rotational power of the rear wheel electric motor MTr is converted into linear power, the friction member is pressed against the rotating member KTr (=KTi, KTj), and the rear wheel braking torque Tqr is generated.

A controller (also referred to as "electronic control unit") ECU is configured by an electric circuit substrate on which a microprocessor MP and a plurality of drive circuit DF, DR are mounted and a control algorithm programmed in the microprocessor MP. The controller ECU controls the electric motor (MTf etc.) and the electromagnetic valve (VM etc.) based on various signals (Ba etc.). Specifically, the electromagnetic valve drive signals Vm, Vr, Vs, Vi, and Vo for controlling the electromagnetic valves VM, VR, VS, VI, and VO are calculated based on a control algorithm in the microprocessor MP. Similarly, a motor drive signal Mt for controlling the electric motor MT is calculated. The plurality of electromagnetic valves and the electric motor are driven based on these drive signals (Vm, Mt, etc.).

In addition, the controller ECU can be divided into a front wheel controller ECB related to the front wheel WHf and a rear wheel controller ECW related to the rear wheel WHr (this configuration is referred to as a "divided configuration"). In this case, in the controller ECU, the front wheel controller ECB and the rear wheel controller ECW are network-connected via the in-vehicle communication bus BS. Power is supplied to the controller ECU from an in-vehicle power supply (storage battery etc.).

First Example of Front Wheel Actuator YP

Figure 2:
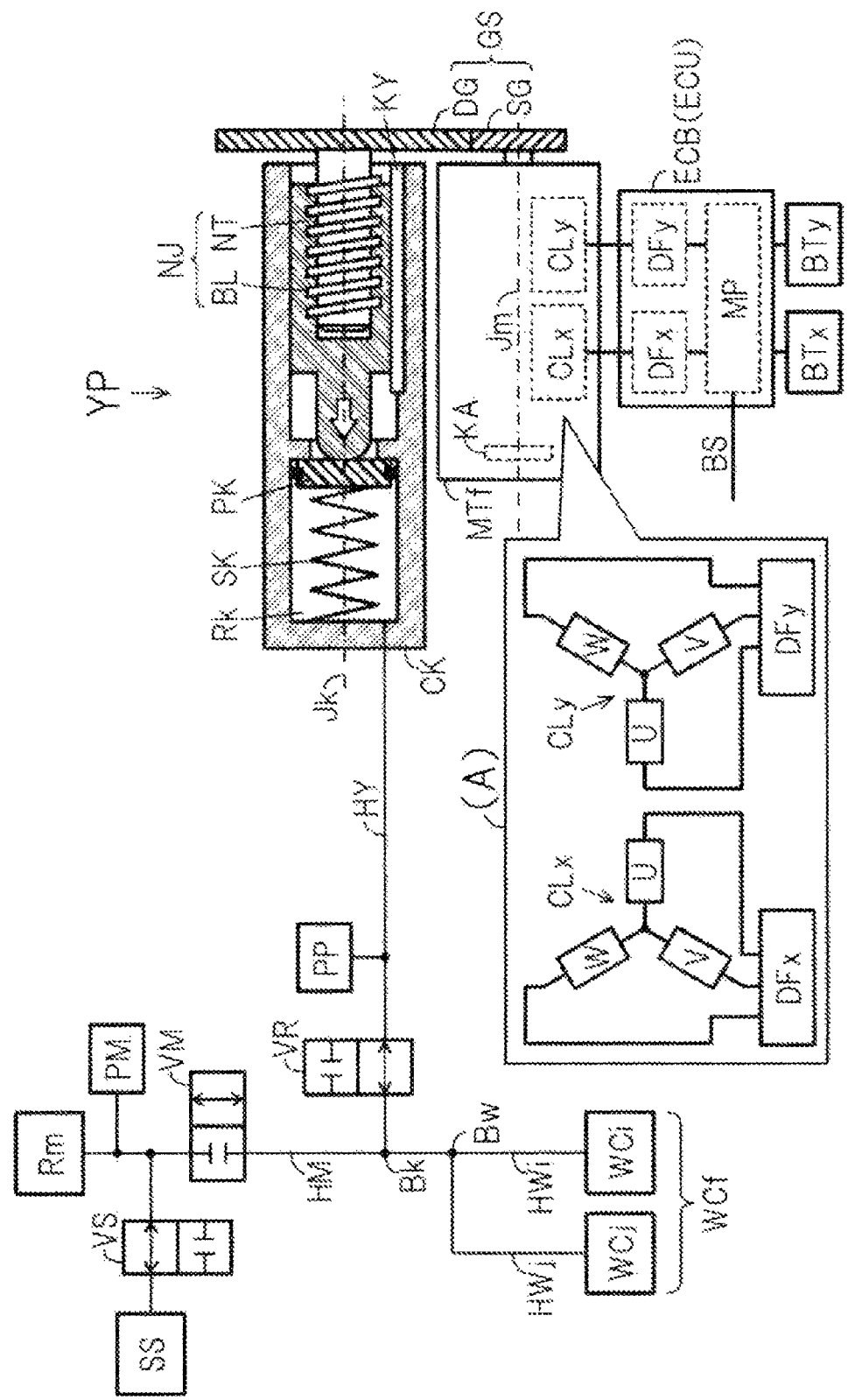
FIG. 2 is a schematic view describing a first example of a front wheel actuator YP.

A first example of the front wheel actuator YP will be described with reference to the schematic diagram of FIG. 2

(VI and VO are not illustrated.). In the figure, a state during operation of the braking control device SC is illustrated. That is, the on/off electromagnetic valves VS, VM, and VR are energized, the electromagnetic valves VS and VR are opened, and the electromagnetic valve VM is closed. Therefore, the master cylinder chamber Rm is connected to the simulator SS, and the operation characteristic of the braking operation member BP is formed by the simulator SS. In addition, in the figure, the above-described divided configuration (ECB and ECW) is adopted in the controller ECU.

The front wheel actuator YP is configured by a front wheel electric motor MTf driven by a front wheel controller ECB (a part of the controller ECU), a speed reducer GS, a rotation/linear motion conversion mechanism (e.g., a screw mechanism) NJ, a pressure adjusting piston PK, a pressure adjusting cylinder CK, and a return spring SK. The front wheel actuator YP is connected to the master cylinder fluid passage HM via the communication valve VR between the shutoff valve VM and the master cylinder chamber Rm of the front-wheel wheel cylinder WCf (lower portion Bk of the shutoff valve VM).

The front wheel electric motor MTf is a drive source of the front wheel actuator YP. The hydraulic pressure (adjusted hydraulic pressure) Pp of the lower portion of the shutoff valve VM is adjusted by the rotational power of the electric motor MTf. The electric motor MTf is driven by the front wheel controller ECB.

Power is supplied to the front wheel controller ECB from an in-vehicle power source (storage battery BT etc.). For example, the storage battery is duplicated as one side and other side storage batteries BTx and BTy. The controller ECB includes a microprocessor MP and one-side and the other-side front wheel drive circuits DFx and DFy.

The microprocessor MP is programmed with a control algorithm for driving switching elements (power semiconductor devices such as MOS-FETs and IGBTs) of the front wheel drive circuits DFx and DFy. A communication bus BS is connected to the microprocessor MP, and information is shared with the rear wheel controller ECW and the like. In addition, in the microprocessor MP as well, duplexing is performed in order to ensure the redundancy.

As illustrated in the blow-out part (A), the front wheel electric motor MTf includes winding sets CLx and CLy of two systems. The one-side motor winding set (also referred to as "one-side motor coil") CLx is energized by the one-side drive circuit DFx of the controller ECB. The other-side motor winding set (also referred to as "other-side motor coil") CLy is energized by the other-side drive circuit DFy of the controller ECB. Therefore, the electric motor MTf is driven by at least one of the one-side drive circuit DFx and the other-side drive circuit DFy. Since the electric motor MTf adopts a redundant (dual system) configuration, the electric motor MTf can operate even if any one of the "one-side motor coil CLx, one-side drive circuit DFx, or a member related thereto" and the "other-side motor coil CLy, other-side drive circuit DFy, or a member related thereto" malfunctions. That is, the front wheel electric motor MTf is electrically duplicated by the motor coils CLx and CLy of two systems.

For example, a three-phase brushless motor is adopted as the electric motor MTf. The brushless motor MTf is provided with a rotation angle sensor KA that detects a rotor position (rotation angle) Ka of the motor. A coil set (winding set) of three phases (U-phase, V-phase, W-phase) is formed in each of the one-side motor coil CLx and the other-side motor coil CLy. The energization directions (that is, the excitation direction) of the two three-phase motor coils CLx and CLy are sequentially switched based on the rotation angle (actual value) Ka, and the brushless motor MTf is rotationally driven. Note that two sets of detection units can also be adopted for the rotation angle sensor KA in order to ensure redundancy.

The actual rotation angle Ka can be estimated by a known method (e.g., a method of performing 120 degree energization and detecting zero crossing of an induced voltage, a method of using a neutral point potential, a method of using an estimated induced voltage of a dq rotational coordinate model, a method of applying an extended Kalman filter to an αβ fixed coordinate model, and a method of using a state observer). Therefore, when the rotation angle Ka is estimated and calculated, the rotation angle sensor KA may be omitted.

The speed reducer GS includes a small-diameter gear SG and a large-diameter gear DG. The rotational power of the electric motor MTf is reduced by the speed reducer GS and transmitted to the screw mechanism NJ. Specifically, the small-diameter gear SG is fixed to the output shaft Jm of the electric motor MT. The small-diameter gear SG is engaged with the large-diameter gear DG. The large-diameter gear DG and the bolt member BL are fixed such that the rotation axis Jk of the large-diameter gear DG coincides with the rotation axis Jk of the bolt member BL of the screw mechanism NJ. That is, in the speed reducer GS, the rotational power from the electric motor MTf is input to the small-diameter gear SG, which is then reduced and output from the large-diameter gear DG to the screw mechanism NJ.

The screw mechanism (rotation/linear motion conversion mechanism) NJ includes a bolt member BL and a nut member NT. In the screw mechanism NJ, the rotational power of the speed reducer GS is converted into the linear motion power of the pressure adjusting piston PK. Specifically, the bolt member BL is fixed coaxially with the large-diameter gear DG, and the nut member NT screwed with the bolt member BL is moved by the rotation of the bolt member BL. When the pressure adjusting piston PK is pushed by the nut member NT, it is converted into linear motion power of the pressure adjusting piston PK. Here, since the rotational movement of the nut member NT is restrained by the key member KY, the nut member NT is moved in the direction of the rotation axis Jk of the large-diameter gear DG (the central axis line of the pressure adjusting cylinder CK). Then, the pressure adjusting piston PK is pressed by the nut member NT. As the screw mechanism NJ, a "sliding screw" such as a trapezoidal screw is adopted. Furthermore, as the screw mechanism NJ, a "rolling screw" such as a ball screw can be adopted.

The pressure adjusting piston PK is inserted into an inner hole of the pressure adjusting cylinder CK, and a combination of the piston/cylinder is formed. Specifically, a hydraulic pressure chamber Rk (referred to as a "pressure adjusting chamber") is formed by the "inner peripheral surface and bottom surface of the pressure adjusting cylinder CK" and the "end face of the pressure adjusting piston PK". The pressure adjusting chamber Rk is connected to the master cylinder fluid passage HM via the communication fluid passage HY. The volume of the pressure adjusting chamber Rk changes by the movement of the pressure adjusting piston PK. At this time, since the communication valve VR is at the open position and the shutoff valve VM is at the closed position, the braking fluid BF is not moved to the master cylinder chamber Rm but is moved with respect to the wheel cylinder WCf.

When the electric motor MTf is rotationally driven in the forward rotation direction, the volume of the pressure adjusting chamber Rk decreases, and the braking fluid BF is moved from the pressure adjusting cylinder CK to the wheel cylinder WCf. As a result, the adjusted hydraulic pressure Pp (that is, the braking fluid pressure Pwf) increases, and the front wheel braking torque Tqf increases. On the other hand, when the electric motor MTf is rotationally driven in the reverse rotation direction, the volume of the pressure adjusting chamber Rk increases, and the braking fluid BF is returned from the wheel cylinder WCf to the pressure adjusting cylinder CK. As a result, the adjusted hydraulic pressure Pp (=Pwf) decreases, and the front wheel braking torque Tqf decreases. An adjusted hydraulic pressure sensor PP is provided in the communication fluid passage HY so as to detect the adjusted hydraulic pressure Pp. A return spring (elastic body) SK is provided in the pressure adjusting chamber Rk, and the pressure adjusting piston PK is returned to its initial position when the energization to the electric motor MTf is stopped.

<Configuration of Controller ECU and the Like Corresponding to First Example of Front Wheel Actuator YP>

Figure 3:
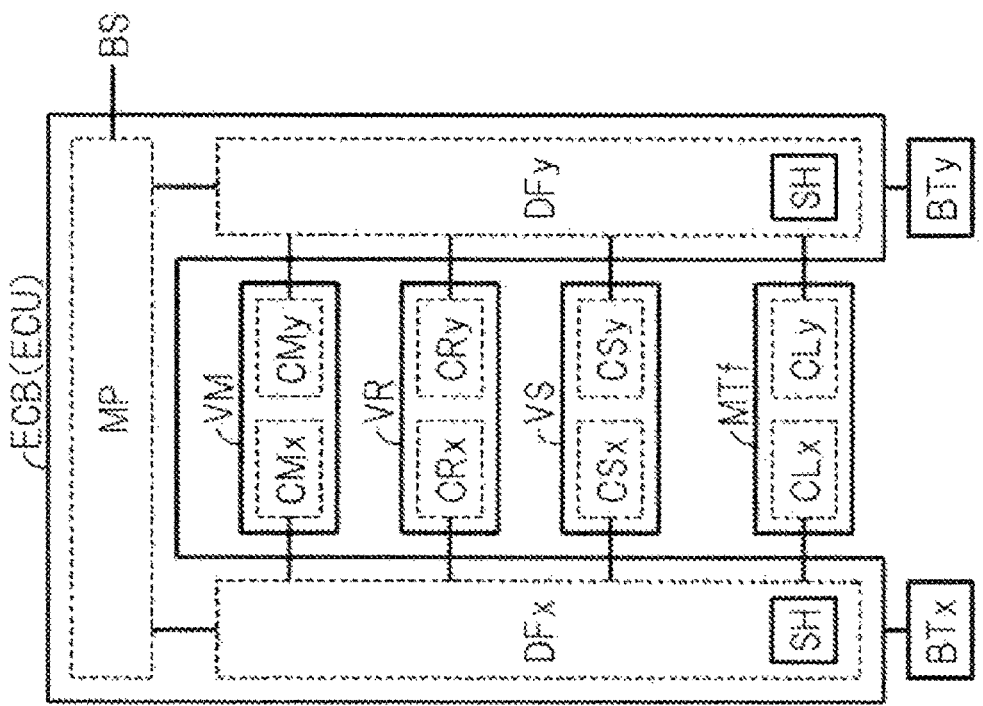
FIG. 3 is a schematic view describing a controller ECU corresponding to the first example of the front wheel actuator YP.

Configurations of the controller ECU (in particular, the front wheel drive circuits DFx and DFy), the front wheel electric motor MTf, the shutoff valve VM, the communication valve VR, and the simulator valve VS corresponding to the first example of the front wheel actuator YP will be described with reference to the schematic diagram of FIG. 3.

Power is supplied from the power sources (storage batteries) BTx and BTy to the front wheel controller ECB (a part of the controller ECU). The electric motor MTf, the shutoff valve VM, the communication valve VR, and the simulator valve VS are driven by the controller ECB. The controller ECB includes a microprocessor MP and front wheel drive circuits DFx and DFy. In the microprocessor MP, an algorithm for controlling the electric motor MTf, the shutoff valve VM, the communication valve VR, and the simulator valve VS is programmed.

The microprocessor MP is duplicated to improve the reliability of the braking control device SC. In addition, an electric circuit that drives the electric motor MTf, the shutoff valve VM, the communication valve VR, and the simulator valve VS is made redundant as the drive circuits DFx and DFy. Furthermore, in order to downsize the electric motor MTf and the electromagnetic valves VM, VR, and VS, the drive circuits DFx and DFy include a booster circuit SH (DC/DC converter). The booster circuit SH makes the drive voltages of the electric motor MTf and the electromagnetic valve (VM etc.) to be higher than the voltage (power supply voltage) of the storage battery BT or the like. Furthermore, the drive voltage of only the electric motor MTf may be increased by the booster circuit SH, and the drive voltage of the electromagnetic valve may remain the power supply voltage. In addition, the booster circuits SH of the one-side and the other-side front wheel drive circuits DFx and DFy may be omitted (that is, the controller ECB does not include the booster circuit SH).

In the one-side and the other-side front wheel drive circuits DFx and DFy, three-phase (U-phase, V-phase, W-phase) bridge circuits are formed by switching elements (power semiconductor devices such as MOS-FETs and IGBTs) so as to drive the front wheel electric motor MTf. Based on the motor drive signal Mt, the energization state of each switching element of the front wheel drive circuits DFx and DFy is controlled, and the output of the electric motor MTf is controlled. Furthermore, the front wheel drive circuits DFx and DFy include an electric circuit that drives the shutoff valve VM, the communication valve VR, and the simulator valve VS. The excitation state (energization state) of the coils of each of the electromagnetic valves is controlled (driven) based on the drive signals Vm, Vr, Vs.

The front wheel electric motor MTf includes winding sets (coils) CLx and CLy of two systems. The one-side front wheel motor coil CLx of the two-system coils is energized by the one-side front wheel drive circuit DFx. The other-side front wheel motor coil CLy of the two-system coils is energized by the other-side front wheel drive circuit DFy. Therefore, the front wheel electric motor MTf is driven by at least one of the two front wheel drive circuits DFx and DFy. Since the front wheel electric motor MTf adopts a redundant (dual system) configuration, the wheel electric motor MTf can operate even if any one of the "one-side front wheel motor coil CLx, one-side front wheel drive circuit DFx, or a member related thereto" and the "other-side wheel motor coil CLy, other-side front wheel drive circuit DFy, or a member related thereto" malfunctions. That is, the front wheel electric motor MTf is electrically duplicated by including the two-system coils CLx and CLy.

The normally-open shutoff valve VM includes two windings (coils) CMx and CMy. The one-side master cylinder valve coil CMx is energized by the one-side front wheel drive circuit DFx, and the other-side master cylinder valve coil CMy is energized by the other-side front wheel drive circuit DFy. The normally-closed simulator valve VS includes two windings (coils) CSx and CSy. The one-side simulator valve coil CSx is energized by the one-side front wheel drive circuit DFx, and the other-side simulator valve coil CSy is energized by the other-side front wheel drive circuit DFy. The normally-closed communication valve VR includes two windings (coils) CRx and CRy. The one-side communication valve coil CRx is energized by the one-side front wheel drive circuit DFx, and the other-side communication valve coil CRy is energized by the other-side front wheel drive circuit DFy. Therefore, the electromagnetic valves VM, VS, and VR are driven by at least one of the front wheel drive circuits DFx and DFy. Similarly to the front wheel electric motor MTf, the electromagnetic valves VM, VS, and VR are also electrically duplicated. When the capacity (volume) of the master cylinder MC is sufficiently large and the simulator valve VS is omitted, the member related to the simulator valve VS is omitted.

As described above, the front wheel WHf is electrically duplicated by the motor coils CLx and CLy of the two systems, the master cylinder valve coils CMx and CMy of the two systems, the simulator valve coils CSx and CSy of the two systems, the communication valve coils CRx and CRy of the two systems, and the one-side and other-side front wheel drive circuits DFx and DFy that energize each of the above, respectively. In the above configuration, since duplication by a plurality of configuring members (MTf etc.) is not performed, redundancy is secured in securing the front wheel braking torque Tqf while maintaining miniaturization and weight reduction of the braking control device SC as a whole.

<Rear Wheel Actuator EMr>

Figure 4:
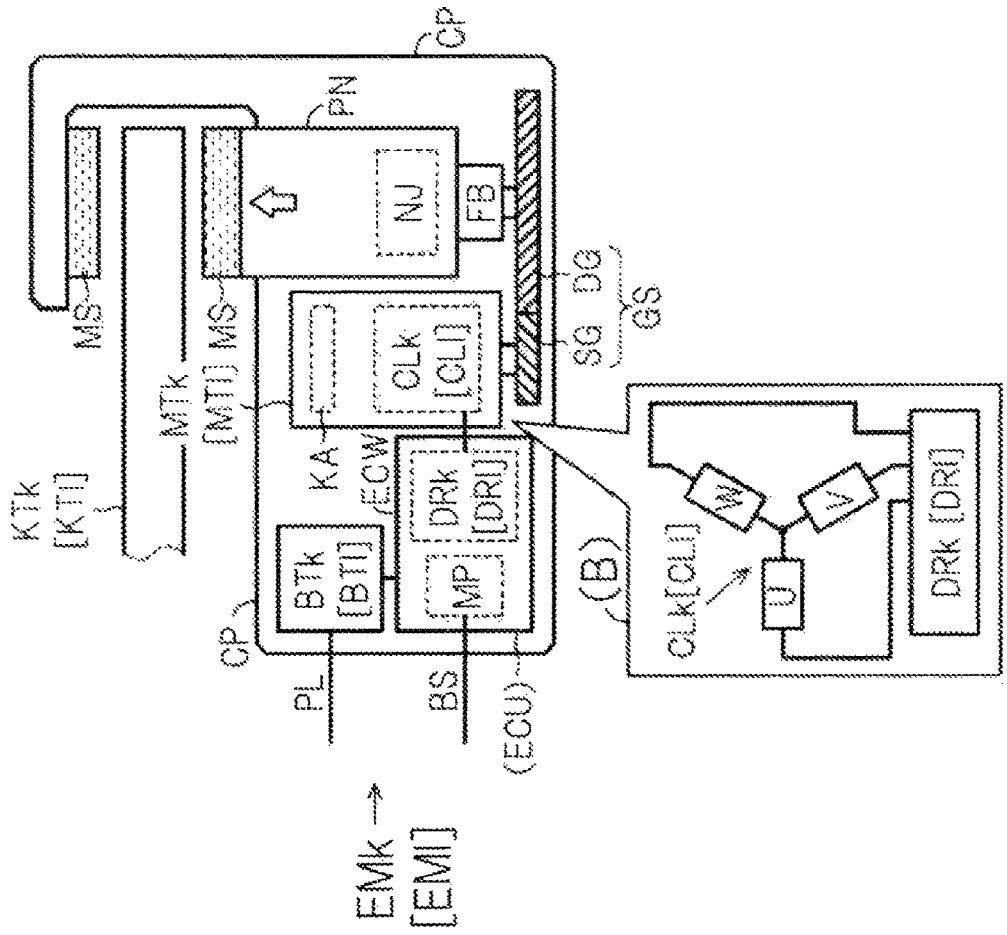
FIG. 4 is a schematic view describing embodiments of rear wheel actuators EMk and EMl including a rear wheel controller ECW.

The rear wheel actuator EMr (first and second rear wheel actuators EMk, EMl) including the rear wheel controller ECW (a part of the controller ECU) will be described with reference to FIG. 4. In the braking control device SC, the braking torque Tqr (=Tqk, Tql) of the rear wheel WHr (first and second rear wheels WHk, WHl) is generated and adjusted by the rear wheel electric motor MTr (first and second electric motors MTk, MTl) without passing through the braking fluid BF. Since the right rear wheel WHk and the left rear wheel WHl have the same configuration, the right rear wheel WHk will be described. The symbol in [ ] corresponds to the left rear wheel WHl.

Similarly to the front wheel WHf, the right rear wheel WHr is also provided with the rotating member KT and the friction member MS. The right rear wheel actuator EMk includes a brake caliper CP, a right rear wheel electric motor MTk (corresponds to a "first electric motor"), a rear wheel controller ECW, a storage battery BTk, a speed reducer GS, a rotation/linear motion conversion mechanism NJ, a brake piston PN, and a pressing force sensor FB. The brake caliper CP is provided so as to sandwich the rotating member KTk of the right rear wheel WHk. The brake caliper CP incorporates an electric motor MTk and the like.

The electric motor MTk is a power source for adjusting the braking torque Tqk of the right rear wheel WHk. Unlike the front wheel electric motor MTf, the right rear wheel electric motor MTk includes a motor coil CLk of one system. When a brushless motor is adopted as the electric motor MTk, the electric motor MTk is driven by the three-phase coil CLk as illustrated in the blow-out part (B).

In the brake caliper CP, a rear wheel controller ECW is provided to drive the right rear wheel electric motor MTk. The rear wheel controller ECW includes a microprocessor MP and a right rear wheel drive circuit DRk. A control algorithm is programmed in the microprocessor MP so as to control the right rear wheel drive circuit DRk (corresponds to "first rear wheel drive circuit"). In addition, the communication bus BS is connected so that information (signal) is shared with the controller ECB and the rear wheel controller ECW of the left rear wheel WHl. The right rear wheel motor coil CLk is driven by the right rear wheel drive circuit DRk, and the energization level to the right rear wheel motor MTk is controlled.

The right rear wheel storage battery BTk is provided in the brake caliper CP. Power is supplied to the storage battery BTk from the storage battery BT on the vehicle body side via the power line PL, and the storage battery BTk is charged. Power is supplied to the controller ECW (ultimately, the electric motor MTk) by the storage battery BTk. The storage battery BTk may be omitted. In this case, power is directly supplied from the storage battery BT on the vehicle body side to the controller ECW by the power line PL.

Similarly to the front wheel actuator YP described with reference to FIG. 2, the rotational output of the rear wheel electric motor MTk is converted to a thrust (force in the direction of the white arrow) of the brake piston PN via the speed reducer GS and the rotation/linear motion conversion mechanism (screw mechanism) NJ. The brake piston PN presses the friction member (brake pad) MS against the rotating member (brake disc) KT. At this time, the braking torque Tqk is generated in the right rear wheel WHk by the frictional force generated between the friction member MS and the rotating member KT. The right rear wheel actuator EMk is provided with a pressing force sensor FB so as to detect a pressing force Fb which is a force by which the friction member MS is pressed against the rotating member KT.

The actuator EMk of the right rear wheel WHk has been described above. Regarding the actuator EMl of the left rear wheel WHl, the description in which the subscript "k" is replaced with the subscript "l" corresponds to the description of the left rear wheel actuator EMl. Therefore, the left rear wheel electric brake MTl (corresponds to "second electric motor") is controlled by the left rear wheel drive circuit DRl (corresponds to "second rear wheel drive circuit").

The component (YP, ECB, etc.) related to the front wheel WHf is mounted on the vehicle body side, and the rear wheel actuator EMr (=EMk, EMl) is mounted on the wheel side. For this reason, in the rear wheel actuator EMr, in particular, miniaturization and weight reduction are important in improving mountability. Unlike the front wheel electric motor MTf for the front wheel WHf (=WHi, WHj), the rear wheel actuator EMr electrically has one system. Electrical duplication is not adopted in the rear wheel electric motor MTr (that is, the first and second electric motors MTk and MTl) and the rear wheel drive circuit DRr (that is, the first and second rear wheel drive circuits DRk and DRl) in the controller ECW (a part of the controller ECU). This is based on the fact that the generation of the braking torque Tqr at the rear wheel WHr is duplicated by the left and right rear wheel actuators EMr. With the above configuration, in the rear wheel WHr, the redundancy for securing the braking torque Tqr can be achieved while the mountability is secured.

Second Example of Front Wheel Actuator YP

Figure 5:
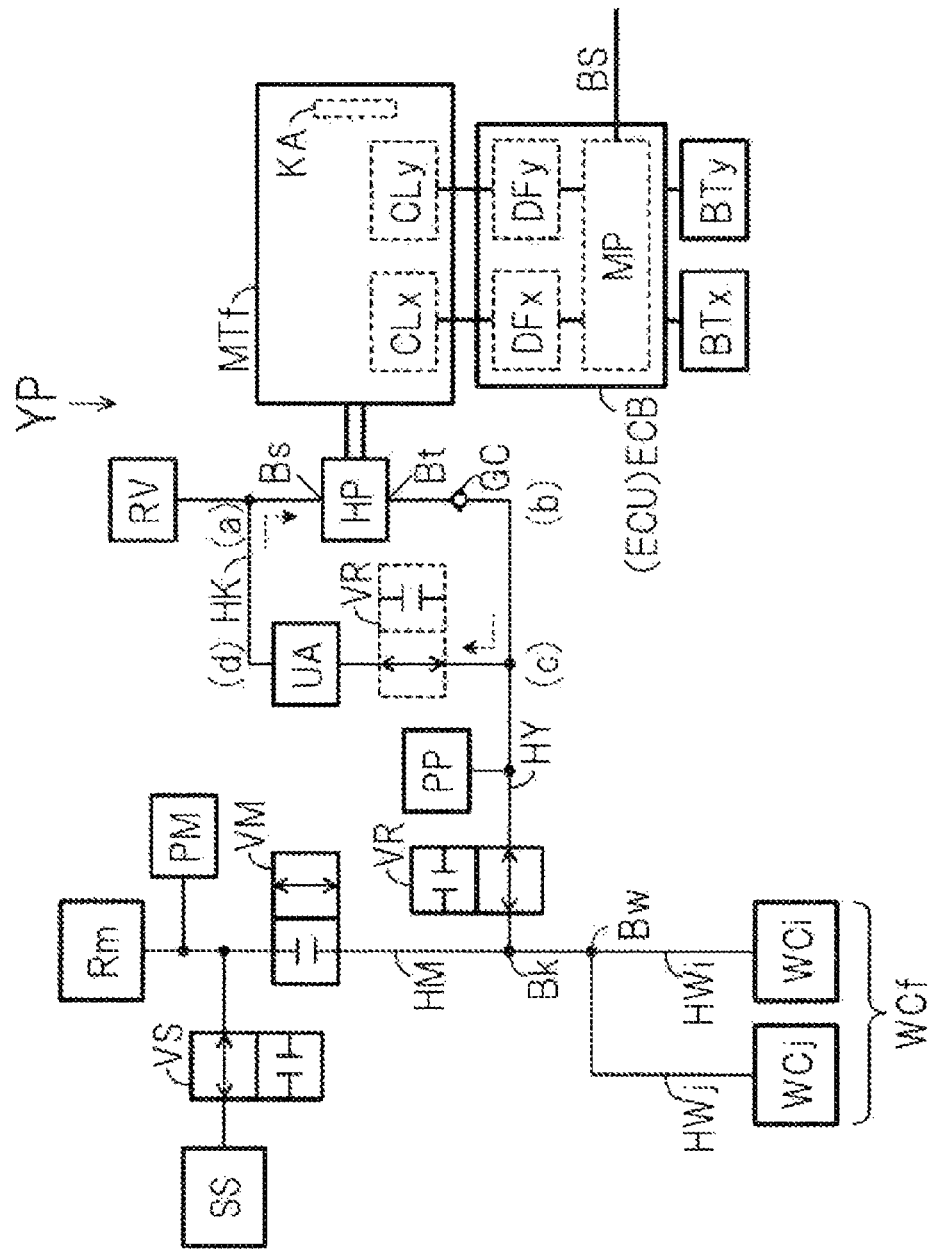
FIG. 5 is a schematic view describing a second example of the front wheel actuator YP.

A second example of the front wheel actuator YP will be described with reference to the schematic diagram of FIG. 5 (VI and VO are not illustrated.). The diagram illustrates the operation of the braking control device SC, in which the electromagnetic valves VS, VM, and VR are energized, and the divided configuration (ECU=ECB+ECW) of the controller ECU is illustrated. In the first example of the front wheel actuator YP, the rotational power of the front wheel electric motor MTf is converted into the linear motion power (thrust) of the pressure adjusting piston PK in the pressure adjusting cylinder CK, and the adjusted hydraulic pressure Pp (=Pwf) is adjusted. In the second example of the front wheel actuator YP, the reflux of the braking fluid BF (the flow of the circulating braking fluid BF) is formed by the rotational power of the front wheel electric motor MTf, and the adjusted hydraulic pressure Pp (=Pwf) is adjusted by the pressure adjusting valve UA.

As described above, the configuring members and the like denoted by the same symbol have the same function. In the subscripts "i" to "l" attached to the end of the symbol related to each wheel, "i" represents the right front wheel, "j" represents the left front wheel, "k" represents the right rear wheel, and "l" represents the left rear wheel. In the subscripts "f" and "r" at the end of the symbol, "f" represents the front wheel (=subscript "i, j"), and "r" represents the rear wheel (=subscript "k, l"). In the subscripts "x" and "y" at the end of the symbol related to the electric system of the front wheel, "x" represents the one-side system, and "y" represents the other-side system. The subscripts "i" to "l", "f", "r", "x", and "y" can be omitted. When these are omitted, each symbol represents a generic name. Hereinafter, differences from the first example will be mainly described.

The hydraulic pressure (braking fluid pressure) Pwf of the front-wheel wheel cylinder WCf is adjusted by the front wheel actuator YP. The front wheel actuator YP includes an electric pump (=MTf+HP), a circulating fluid passage HK, a check valve GC, a pressure adjusting valve UA, and an adjusted hydraulic pressure sensor PP. In the front wheel actuator YP, the braking fluid BF discharged from the electric pump is adjusted to the adjusted hydraulic pressure Pp by the pressure adjusting valve UA. The braking fluid BF in which the adjusted hydraulic pressure Pp is adjusted is supplied to the front-wheel wheel cylinder WCf via the communication valve VR.

The electric pump includes a front wheel electric motor MTf and a fluid pump HP. In the electric pump, the electric motor MTf and the fluid pump HP are fixed such that the electric motor MTf and the fluid pump HP rotate integrally. The electric motor MTf is controlled by the front wheel controller ECB based on the drive signal Mt.

In the fluid pump HP, a suction portion Qs and a discharge portion Qt are connected by way of a circulating fluid passage HK. A reservoir fluid passage HR is connected to the suction portion Qs of the fluid pump HP. Therefore, the braking fluid BF is suctioned from the master reservoir RV through the reservoir fluid passage HR by the suction portion Qs, and discharged from the discharge portion Qt to the circulating fluid passage HK. The check valve GC (also referred to as a "check valve") is provided in the circulating fluid passage HK.

When the front wheel electric motor MTf is driven, the braking fluid BF is refluxed in the circulating fluid passage HK in the order of "(a)→(b)→(c)→(d)→(a)" as indicated by a dotted arrow. A pressure adjusting valve UA is provided in the circulating fluid passage HK. The pressure adjusting valve UA is a linear type electromagnetic valve ("proportional valve" or "differential pressure valve") in which the valve opening amount (lift amount) is continuously controlled based on the energization state (e.g., supply current). The pressure adjusting valve UA is controlled by the controller ECB based on the drive signal Ua. A normally-open electromagnetic valve is adopted as the pressure adjusting valve UA. The flow (reflux) of the braking fluid BF is narrowed by the pressure adjusting valve UA, so that the adjusted hydraulic pressure Pp is adjusted (so-called orifice effect of the pressure adjusting valve UA). The adjusted hydraulic pressure sensor PP is provided to detect the adjusted hydraulic pressure Pp.

A portion (c) between the pressure adjusting valve UA and the check valve GC in the circulating fluid passage HK is connected to a lower portion Bk of the shutoff valve VM in the master cylinder fluid passage HM through the communication fluid passage HY. A normally-closed communication valve VR is provided on the communication fluid passage HY. At the time of braking, the communication valve VR is energized, and the master cylinder fluid passage HM and the circulating fluid passage HK are in a communicating state. Therefore, the braking fluid pressure Pwf (as a result, front wheel braking torque Tqf) of the wheel cylinder WCf is adjusted to the adjusted hydraulic pressure Pp by the front wheel actuator YP.

The normally-closed communication valve VR is for manually braking the braking fluid pressure Pwf (braking only by the operation force Fp of the driver) when the power supply fails completely. Therefore, the communication valve VR may be provided in the circulating fluid passage HK as indicated by a broken line instead of being provided in the communication fluid passage HY.

<Configuration of Controller ECU and the Like Corresponding to Second Example of Front Wheel Actuator YP>

Figure 6:
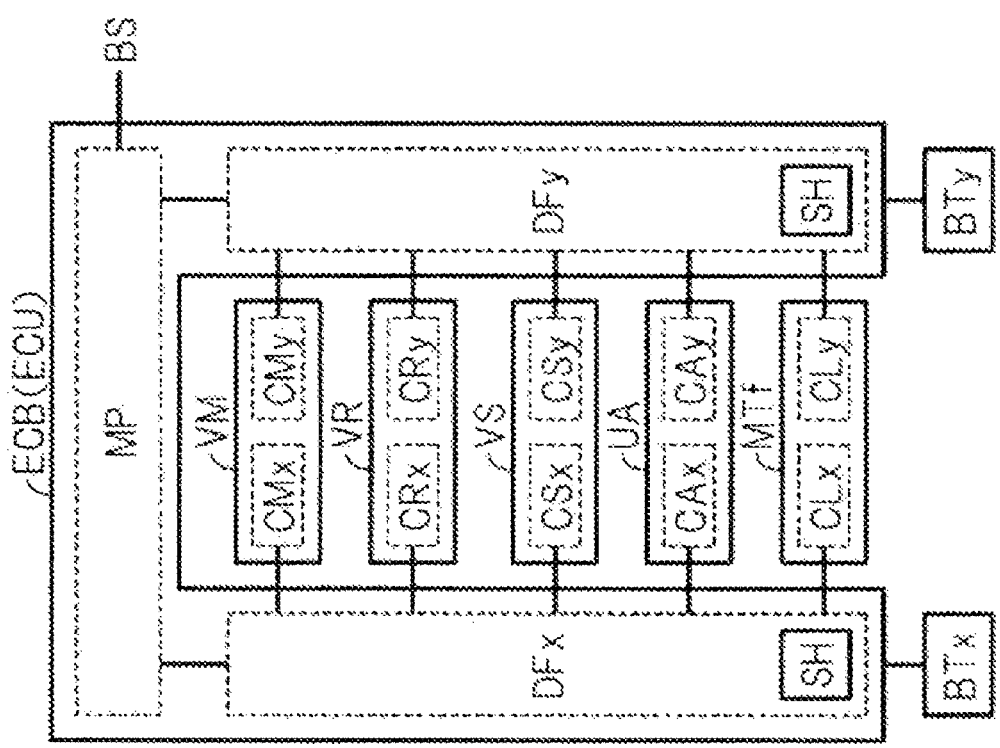
FIG. 6 is a schematic view describing a controller ECU corresponding to the second example of the front wheel actuator YP.

Configurations of the controller ECU (in particular, the front wheel drive circuits DFx and DFy), the front wheel electric motor MTf, the shutoff valve VM, the communication valve VR, the simulator valve VS, and the pressure adjusting valve UA corresponding to the second example of the front wheel actuator YP will be described with reference to the schematic diagram of FIG. 6. In the controller ECU configuration of the second example, since the reflux of the braking fluid BF is narrowed by the pressure adjusting valve UA and the adjusted hydraulic pressure Pp is adjusted, the pressure adjusting valve UA is added to the controller ECU configuration of the second example. The other parts are basically the same as the configuration of the controller ECU of the first example.

Power is supplied from the power sources (storage batteries) BTx and BTy to the front wheel controller ECB (a part of the controller ECU). The front wheel electric motor MTf, the shutoff valve VM, the communication valve VR, the simulator valve VS, and the pressure adjusting valve UA are driven by the controller ECB. The controller ECB includes a duplicated microprocessor MP and drive circuits DFx and DFy. Furthermore, in order to downsize the electric motor MTf and the electromagnetic valves VM, VR, VS, and UA, the front wheel drive circuits DFx and DFy include a booster circuit SH (DC/DC converter).

A three-phase bridge circuit is formed in the one-side and other-side front wheel drive circuits DFx and DFy, and the output of the electric motor MTf is controlled based on the motor drive signal Mt. The drive circuits DFx and DFy include an electric circuit that drives the electromagnetic valves VM, VR, VS, and UA, and the excitation state of the coil is controlled based on the drive signals Vm, Vr, Vs, and Ua.

The front wheel electric motor MTf includes two-system coils CLx and CLy and is duplicated. The one-side front wheel motor coil CLx is energized by the one-side front wheel drive circuit DFx, and the other-side front wheel motor coil CLy is energized by the other-side front wheel drive circuit DFy. That is, the front wheel electric motor MTf is driven by at least one of the two front wheel drive circuits DFx and DFy.

The normally-open shutoff valve VM includes two coils CMx and CMy and is duplicated. The one-side master cylinder valve coil CMx is energized by the drive circuit DFx, and the other-side master cylinder valve coil CMy is energized by the drive circuit DFy. The normally-closed simulator valve VS includes two coils CSx and CSy and is duplicated. The one-side simulator valve coil CSx is energized by the drive circuit DFx, and the other-side simulator valve coil CSy is energized by the drive circuit DFy. The normally-closed communication valve VR includes two windings (coils) CRx and CRy and is duplicated. The one-side communication valve coil CRx is energized by the drive circuit DFx, and the other-side communication valve coil CRy is energized by the drive circuit DFy. The normally-closed pressure adjusting valve UA includes two coils CAx and CAy and is duplicated. The one-side pressure adjusting valve coil CAx is energized by the drive circuit DFx, and the other-side pressure adjusting valve coil CAy is energized by the drive circuit DFy. Therefore, the electromagnetic valves VM, VS, VR, and UA are driven by at least one of the drive circuits DFx and DFy. Similarly to the front wheel electric motor MTf, the electromagnetic valves VM, VS, VR, and UA are also electrically duplicated. When the capacity (volume) of the master cylinder MC is sufficiently large and the simulator valve VS is omitted, the member related to the simulator valve VS is omitted.

As described above, the front wheel actuator YP of the second example is also electrically duplicated by the front wheel motor coils CLx and CLy of the two systems, the master cylinder valve coils CMx and CMy of the two systems, the simulator valve coils CSx and CSy of the two systems, the communication valve coils CRx and CRy of the two systems, the pressure adjusting valve coils CAx and CAy of the two systems, and the one-side and other-side front wheel drive circuits DFx and DFy that energize each of the above, respectively. In the above configuration, since duplication by a plurality of configuring members (MTf etc.) is not performed, redundancy is secured in securing the front wheel braking torque Tqf while maintaining miniaturization and weight reduction of the braking control device SC.

Operation/Effect

In the braking control device SC, the front wheel braking torque Tqf (=Tqi, Tqj) is adjusted by the braking fluid pressure Pwf via the braking fluid BF. On the other hand, the rear wheel braking torque Tqr is adjusted by the two rear wheel electric motors MTk and MTl without using the braking fluid BF. The braking fluid pressure Pwf (=Pwi, Pwj) is adjusted by one front wheel electric motor MTf. Therefore, the front wheel electric motor MTf has two-system coils CLx and CLy. On the other hand, the rear wheel braking torque Tqr (=Tqk, Tql) is separately adjusted by the first and second electric motors MTk, MTl. Since duplication is carried out by the two electric motors (first and second electric motors) MTk and MTl in the rear wheel WHr, the first and second electric motors MTk and MTl have one-system coils CLk and CLl, respectively. The front wheel electric motor MTf and the first and second electric motors MTk and MTl are controlled by the controller ECU. The controller ECU includes "one-side front wheel drive circuit DFx for energizing one side of two-system coils CLx, CLy of the front wheel electric motor MTf", "the other-side front wheel drive circuit DFy that energizes the other side of the two-system coils CLx and CLy of the front wheel electric motor MTf", "a first rear wheel drive circuit DRk that energizes the one-system coil CLk of the first electric motor MTk", and "a second rear wheel drive circuit DRl that energizes the one-system coil CLl of the second electric motor MTl".

With the above configuration, the braking torque Tq of the four wheels WH is adjusted by the electric motor MT. Although the components (MTf etc.) related to the front wheel WHf are electrically duplicated, the components (MTk etc.) related to one wheel of the rear wheel WHr are electrically single. This is based on the fact that the right and left rear wheels WHr are electrically independent from each other. With this configuration, in the motorized braking control device SC, device redundancy is secured, and in addition, miniaturization and weight reduction are achieved.

In the above description, the controller ECU is divided into the front wheel controller ECB and the rear wheel controller ECW. Alternatively, the rear wheel controller ECW may be included in the front wheel controller ECB provided on the vehicle body side. In this case, the controller ECB (=ECU) includes a redundant microprocessor MP and drive circuits DFx, DFy, DRk, and DRl (see FIG. 1). Even in this configuration, the same effect as described above can be obtained.

The invention claimed is:

1. A vehicle braking control device comprising:
a front wheel electric motor that controls a hydraulic pressure of a wheel cylinder of a front wheel of a vehicle to adjust a braking torque of the front wheel;
a first electric motor that adjusts a braking torque of a right rear wheel of the vehicle;
a second electric motor that adjusts a braking torque of a left rear wheel of the vehicle,
a fluid passage connecting a master cylinder with the wheel cylinder of the front wheel of the vehicle, the fluid passage including a master cylinder fluid passage and a wheel cylinder fluid passage, one end portion of the master cylinder fluid passage being connected to the master cylinder and one end portion of the wheel cylinder fluid passage being connected to the wheel cylinder of the front wheel,
a shutoff valve provided in the master cylinder fluid passage,
a communication fluid passage connected to a merging portion between the shutoff valve and the wheel cylinder of the front wheel in the fluid passage
a front wheel actuator connected to the fluid passage through the communication fluid passage, the front wheel actuator configured to be driven by the front wheel electric motor to adjust a hydraulic pressure of a lower portion of the shutoff valve, and
a communication valve provided in the communication fluid passage,
wherein each of the front wheel electric motor, the shutoff valve and the communication valve has a two-system coil, and the first and second electric motors have a one-system coil.

2. The vehicle braking control device according to claim 1, further comprising:
a controller that controls the front wheel electric motor and the first and second electric motors, wherein the controller includes:
a one-side front wheel drive circuit that energizes one side of the two-system coils of the front wheel electric motor, an other-side front wheel drive circuit that energizes the other side of the two-system coils of the front wheel electric motor, a first rear wheel drive circuit that energizes the one-system coil of the first electric motor, and a second rear wheel drive circuit that energizes the one-system coil of the second electric motor.

* * * * *